US010764940B2

(12) United States Patent
Toksoz et al.

(10) Patent No.: US 10,764,940 B2
(45) Date of Patent: Sep. 1, 2020

(54) AUTOMATIC WIRELESS COMMUNICATION PROTOCOL TOGGLING

(71) Applicant: Google LLC, Mountain View, CA (US)

(72) Inventors: Tuna Toksoz, Mountain View, CA (US); Thomas Price, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/441,721

(22) Filed: Jun. 14, 2019

(65) Prior Publication Data
US 2019/0306901 A1    Oct. 3, 2019

Related U.S. Application Data

(63) Continuation of application No. 15/941,900, filed on Mar. 30, 2018, now Pat. No. 10,342,053, which is a
(Continued)

(51) Int. Cl.
H04W 76/10 (2018.01)
H04B 17/318 (2015.01)
H04W 36/14 (2009.01)
H04W 48/18 (2009.01)
H04W 52/24 (2009.01)
H04W 76/00 (2018.01)
H04L 29/06 (2006.01)
(Continued)

(52) U.S. Cl.
CPC .......... *H04W 76/10* (2018.02); *G06F 21/335* (2013.01); *H04B 17/318* (2015.01); *H04L 69/18* (2013.01);
(Continued)

(58) Field of Classification Search
CPC ..... H04W 76/02; H04W 84/18; H04B 17/318
See application file for complete search history.

(56) References Cited

U.S. PATENT DOCUMENTS 7,239,874 B2   7/2007 Reddy et al.
8,521,135 B2   8/2013 Cryderman
(Continued)

FOREIGN PATENT DOCUMENTS

WO   2011133195 A1   10/2011
WO   2011153507 A2   12/2011
(Continued)

OTHER PUBLICATIONS

Open Garden, FireChat-About, Retrieved on Nov. 20, 2015 from <http://opengarden.com/about> 3 pgs.
(Continued)

*Primary Examiner* — Afshawn M Towfighi
(74) *Attorney, Agent, or Firm* — Honigman LLP; Brett A. Krueger

(57) ABSTRACT

In general, this disclosure is directed to techniques for toggling communication connections based on signal strengths. A first computing device receives an indication of a user input to send data packets to a second computing device. Responsive to receiving the indication, the first computing device determines a signal strength of a first wireless communication connection, comprising one of a cellular network connection or a wireless local area network connection, to the second computing device, and determines whether the signal strength satisfies a threshold signal strength level. Responsive to determining that the signal strength does not satisfy the threshold signal strength level, the first computing device automatically establishes a second wireless communication connection, including a mesh network using a different wireless communication protocol than the first wireless communication connection, to the second computing device, and sends the data packets to the second computing device via the second wireless communication connection.

20 Claims, 4 Drawing Sheets

Related U.S. Application Data continuation of application No. 15/079,306, filed on Mar. 24, 2016, now Pat. No. 9,949,302.

(51) Int. Cl.
*G06F 21/33* (2013.01)
*H04W 84/18* (2009.01)
*H04W 88/06* (2009.01)
*H04W 84/10* (2009.01)
*H04W 72/08* (2009.01)

(52) U.S. Cl.
CPC ........... *H04W 36/14* (2013.01); *H04W 48/18* (2013.01); *H04W 52/24* (2013.01); *H04W 52/245* (2013.01); *H04W 76/00* (2013.01); *H04W 72/085* (2013.01); *H04W 84/10* (2013.01); *H04W 84/18* (2013.01); *H04W 88/06* (2013.01)

(56) References Cited

U.S. PATENT DOCUMENTS

| | | | |
|---|---|---|---|
| 8,848,558 B1* | 9/2014 | Martin | H04L 41/12 370/252 |
| 8,958,823 B2 | 2/2015 | Ortiz | |
| 9,078,121 B2 | 7/2015 | Georgescu et al. | |
| 9,144,107 B2 | 9/2015 | Dravida et al. | |
| 9,949,302 B2 | 4/2018 | Price et al. | |
| 2002/0187784 A1 | 12/2002 | Tigerstedt et al. | |
| 2011/0161525 A1* | 6/2011 | Tanimoto | H04L 61/303 709/249 |
| 2013/0121145 A1 | 5/2013 | Draznin et al. | |
| 2014/0141714 A1 | 5/2014 | Ghosh et al. | |
| 2014/0148119 A1 | 5/2014 | Stauffer et al. | |
| 2017/0280487 A1 | 9/2017 | Price et al. | |

FOREIGN PATENT DOCUMENTS

| | | |
|---|---|---|
| WO | 2014140526 A1 | 9/2014 |
| WO | 2014184605 A1 | 11/2014 |

OTHER PUBLICATIONS

Network-Project Fi, Retrieved on Mar. 23, 2016 from <http://fi.google.com/about/network/> 13 pgs.
International Search Report and Written Opinion of International Application No. PCT/US2016/068936, dated Mar. 31, 2017, 13 pp.
Prosecution History from U.S. Appl. No. 15/079,306, dated Aug. 18, 2017 through Dec. 11, 2017, 14 pp.

* cited by examiner

AUTOMATIC WIRELESS COMMUNICATION PROTOCOL TOGGLING

CROSS REFERENCE TO RELATED APPLICATIONS

This U.S. patent application is a continuation of, and claims priority under 35 U.S.C. § 120 from, U.S. patent application Ser. No. 15/941,900, filed on Mar. 30, 2018, which is a continuation of U.S. patent application Ser. No. 15/079,306, filed on Mar. 24, 2016. The disclosures of these prior applications are considered part of the disclosure of this application and are hereby incorporated by reference in their entireties.

BACKGROUND

Generally, mobile devices utilize cellular networks or wireless local area networks (e.g., WI-FIS) to send messages to other mobile devices. Mobile devices may only send these messages when there is a sufficient signal strength level on the respective cellular network or wireless local area network at the mobile device's location at the time the mobile device is attempting to send the message. Due to the nature of privatized cellular networks, different cellular networks have varied signal strengths in different areas, including dead zones where a particular cellular network has no coverage. Weak-network connection strength situations prevent the mobile devices connected to these cellular networks from being able to successfully send or receive messages. Further, because mobile devices communicating over a cellular network or a wireless local area network must first communicate with a central server before sending the final message to the intended recipient, a weak network connection strength may prevent mobile devices from sending messages to one another even though the two devices may be in close proximity to one another.

SUMMARY

In one example, a method may include receiving, by a first computing device, an indication of a user input to send, using an application currently executing at the first computing device, one or more data packets to a second computing device, responsive to receiving the indication of the user input, determining, by the first computing device, a signal strength of a first wireless communication connection to the second computing device, wherein the first wireless communication connection comprises one of a cellular network connection or a wireless local area network connection, and determining, by the first computing device, whether the signal strength of the first wireless communication connection satisfies a threshold signal strength level. The method may further include, responsive to determining that the signal strength does not satisfy the threshold signal strength level: automatically establishing, by the first computing device, a second wireless communication connection to the second computing device, wherein the second wireless communication connection includes a mesh network and uses a different wireless communication protocol than the first wireless communication connection, and sending, by the first computing device, to the second computing device, and via the second wireless communication connection, the one or more data packets.

In another example, a computing device may include a wireless radio configured to send and receive data packets via a plurality of wireless communication connections, one or more processors, and a storage device configured to store one or more modules. The one or more modules may be operable by the at least one processor to receive an indication of a user input to send, using an application currently executing at the computing device, one or more data packets to a second computing device, responsive to receiving the indication of the user input, determine a signal strength of a first wireless communication connection to the second computing device, wherein the first wireless communication connection comprises one of a cellular network connection or a wireless local area network connection, and determine whether the signal strength of the first wireless communication connection satisfies a threshold signal strength level. Responsive to determining that the signal strength does not satisfy the threshold signal strength level, the one or more modules may further be operable by the at least one processor to automatically establish, using the wireless radio, a second wireless communication connection to the second computing device, wherein the second wireless communication connection includes a mesh network and uses a different wireless communication protocol than the first wireless communication connection and send, using the wireless radio, to the second computing device, and via the second wireless communication connection, the one or more data packets.

In another example, the disclosure is directed to a computing device that may include means for receiving an indication of a user input to send, using an application currently executing at the computing device, one or more data packets to a second computing device, responsive to receiving the indication of the user input, means for determining a signal strength of a first wireless communication connection to the second computing device, wherein the first wireless communication connection comprises one of a cellular network connection or a wireless local area network connection, and means for determining whether the signal strength of the first wireless communication connection satisfies a threshold signal strength level. Responsive to determining that the signal strength does not satisfy the threshold signal strength level, the computing device may further include means for automatically establishing a second wireless communication connection to the second computing device, wherein the second wireless communication connection includes a mesh network and uses a different wireless communication protocol than the first wireless communication connection, and means for sending, to the second computing device, and via the second wireless communication connection, the one or more data packets.

In another example, a computer-readable storage medium may be encoded with instructions that, when executed, cause at least one processor of a computing device to: receive an indication of a user input to send, using an application currently executing at the first computing device, one or more data packets to a second computing device, responsive to receiving the indication of the user input, determine a signal strength of a first wireless communication connection to the second computing device, wherein the first wireless communication connection comprises one of a cellular network connection or a wireless local area network connection, and determine whether the signal strength of the first wireless communication connection satisfies a threshold signal strength level. Responsive to determining that the signal strength does not satisfy the threshold signal strength level, the instructions may further cause the at least one processor to automatically establish a second wireless communication connection to the second computing device, wherein the second wireless communication connection includes a mesh network and uses a different wireless communication protocol than the first wireless communication connection, and send to the second computing device, and via the second wireless communication connection, the one or more data packets.

The details of one or more examples of the disclosure are set forth in the accompanying drawings and the description below. Other features, objects, and advantages of the disclosure will be apparent from the description and drawings, and from the claims.

DETAILED DESCRIPTION

In general, this disclosure is directed to techniques for automatically managing active communication connections based on a signal strength of a default communication connection. For instance, a computing device may receive an indication of user input to send data packets, such as a text message, to a recipient. The computing device may attempt to send the data packets to the second computing device via a default communication connection, such as over a cellular network. However, cellular networks may not provide coverage for an entire geographic area and may have so-called "dead zones," where the computing device may not have sufficient signal strength to send the data packets. If the computing device determines that the default communication connection is too weak, the computing device may automatically establish a mesh network with other nearby computing devices and send the data packets to the other nearby computing devices. In various instances, the data packets may be forwarded amongst the other computing devices within the mesh network until one of the other computing device has sufficient signal strength to send the data packets. That other computing device may forward the data packets to a server over the cellular network, which may then forward the data packets to the intended recipient.

Utilizing the techniques described herein, a computing device may reliably and efficiently send data packets to a recipient computing device even when the cellular network signal strength for that particular device is too weak to send the data packets. Further, by automatically establishing the mesh network, the techniques described herein may remove the need for a computing device to receive further input from the user in order to send the data packet, such as by switching applications or cellular networks. Rather than requiring a computing device to switch between multiple subscriber identity module (SIM) cards to connect to multiple different cellular networks, a computing device may be configured to establish a mesh network between other computing devices to send data packets in areas with a weak signal strength, utilizing the cellular networks of other devices to reduce the cost and hardware complexity of the computing device itself. Establishing mesh networks may be less expensive and more reliable than a single user owning multiple computing devices, each on a different cellular network.

Figure 1:
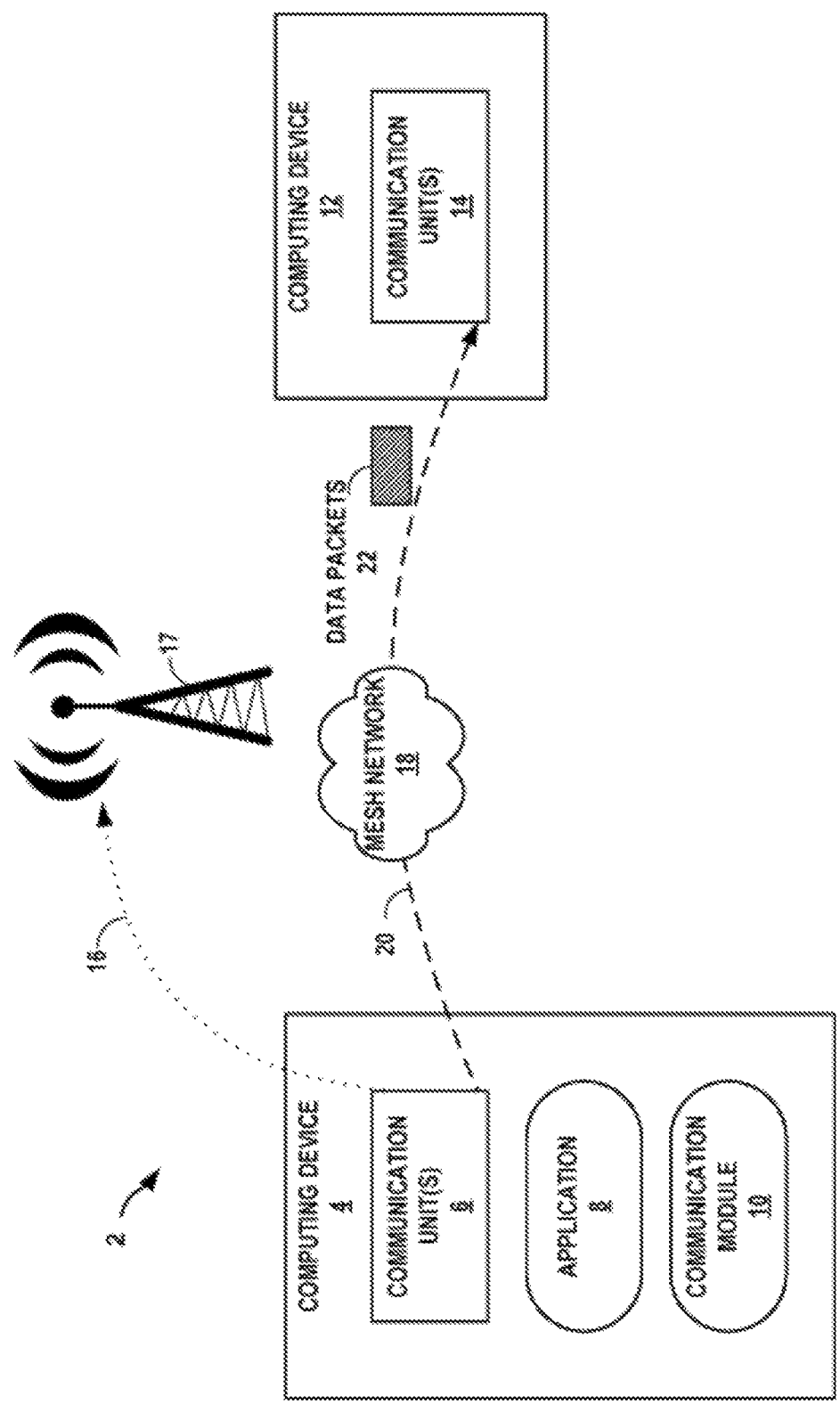
FIG. 1 is a conceptual diagram illustrating an example computing device configured to automatically establish a different network connection to send data packets to other computing devices, in accordance with one or more aspects of the present disclosure.

FIG. 1 is a conceptual diagram illustrating an example computing device configured to automatically establish a different network connection to send data packets to other computing devices, in accordance with one or more aspects of the present disclosure. As further described below, based at least in part on a signal strength for a default communication connection, a computing device may automatically establish a mesh network using a different type of communication connection to send one or more data packets to a recipient computing device.

As shown in FIG. 1, system 2 includes computing device 4 and computing device 12. In the example of FIG. 1, computing device 4 and computing device 12 are described as mobile telephones. However, in some examples, computing device 4 and computing device 12 may be computerized watches (e.g., a smartwatches), computerized eyewear, computerized headwear, other types of wearable computing devices, tablet computers, personal digital assistants (PDAs), laptop computers, gaming systems, media players, e-book readers, television platforms, automobile navigation systems, digital cameras, or any other type of mobile and/or non-mobile computing devices that are configured to send data packets to other computing devices. A respective display component may be integral to or remote from computing device 4 and computing device 12.

Computing device 4 includes communication unit 6, application 8, and communication module 10. Application 8 and module 10 may perform operations described herein using software, hardware, firmware, or a mixture of hardware, software, and/or firmware residing in and/or executing at computing device 4. Computing device 4 may execute application 8 and module 10 with one or more processors. In some examples, computing device 4 may execute application 8 and module 10 as one or more virtual machines executing on underlying hardware of computing device 4. Application 8 and module 10 may execute as one or more services or components of operating systems or computing platforms of computing device 4. Application 8 and module 10 may execute as one or more executable programs at application layers of computing platforms of computing device 4 with operating system privileges or with access to a runtime library of computing device 4. In some examples, communication unit 6, application 8, and/or module 10 may be arranged remotely to and be remotely accessible to computing device 4, for instance, via interaction by computing device 4 with one or more remote network devices.

Computing device 4 also includes one or more communication units 6. Computing device 4, in one example, utilizes communication unit 6 to communicate with external devices via one or more networks, such as one or more wired or wireless networks. Communication unit 6 may be a network interface card, such as an Ethernet card, an optical transceiver, a radio frequency transceiver, or any other type of device that can send and receive information. Examples of such network interfaces may include BLUETOOTH®, infrared signaling, 3G, long-term evolution (LTE), and WI-FI® radios as well as Universal Serial Bus (USB) and Ethernet. In some examples, computing device 4 utilizes communication unit 6 to wirelessly communicate with another computing device that is operably coupled to computing device 4. Computing device 12 also includes one or more communication units 14, which may be similar to communication unit 6 of computing device 4.

In accordance with techniques of this disclosure, computing device 4 may receive an indication of a user input to send, using application 8 currently executing at computing device 4, one or more data packets 22 to computing device 12. In sending one or more data packets 22, application 8 may provide data to communication unit 6, including an intended recipient and one or more data packets 22, possibly via an operating system of computing device 4. Communication unit 6 may then send one or more data packets 22 to computing device 12. For instance, application 8 may be a text messaging application configured to output data packets related to standard messaging service (SMS) text messages. In such instances, the text messaging application is currently executing at computing device 4 and may receive an indication of a user input to send a text message to a recipient associated with computing device 12. The text messaging application may provide the requisite data to an operating system of computing device 4, which formats the data into a packet structure in accordance with a particular network protocol to be used to send the data packets. Communication unit 6 may attempt to send the provided data packets to computing device 12 via signal 16.

Responsive to receiving the indication of the user input, communication module 10 of computing device 4 may determine a signal strength of a first wireless communication connection. In some examples, the first wireless communication connection may be one of a cellular network connection or a wireless local area network connection (e.g., WI-FI®). For instance, communication module 10 may determine the signal strength using data from communication unit 6, with the signal strength measured either at a single point in time or averaged over some amount of time. In some examples, communication unit 6 may be configured to measure the current signal strength, such as in dBm (i.e., the power ration in decibels of the radio power per one milliwatt) or arbitrary strength units (ASU, i.e., a representation of a rate at which computing device 4 is able to update its location by connecting to nearby network sources). In other instances, communication unit 6 may output signal 16 in an attempt to contact central server 17. In the example of FIG. 1, output signal 16 may have a weak signal strength or computing device 4 may be unable to establish a connection to central server 17. The result of the attempted communication may be the basis for communication module 10 determining the signal strength of the first wireless communication.

Communication module 10 may further determine whether the signal strength of the first wireless communication connection satisfies a threshold signal strength level. For instance, a signal strength of −112 dBm may be low enough to routinely drop data packets or telephone calls in transmission. As such, communication module 10 may determine whether the signal strength is above or below −112 dBm. In another instance, a signal strength of 1 ASU may be low enough to routinely drop data packets or telephone calls in transmission. As such, communication module 10 may determine whether the signal strength is above or below 1 ASU. While the example of −112 dBm and 1 ASU are provided as examples of a threshold signal strength level in the example of FIG. 1, computing device 4 may institute a higher or lower threshold signal strength level based on a number of factors, including desirability to send communications of the first or second wireless communication connection, battery life, location of the intended recipient, or previous data usage, among other things.

Responsive to determining that the signal strength does not satisfy the threshold signal strength level, communication module 10 of computing device 4 may automatically establish a different wireless communication connection to mesh network 18 over which one or more data packets 22 are sent to computing device 12. The second wireless communication connection may include mesh network 18 and use a different wireless communication protocol than the first wireless communication connection. For instance, if communication module 10 determines that the signal strength is −113 dBm, communication module 10 may toggle the type of communication connection and automatically connect to mesh network 18.

Mesh network 18 includes one or more other computing devices with capabilities similar to that of computing device 4. In some instances, such as the example of FIG. 1, mesh network 18 may also include computing device 12, the intended recipient of data packets 22. While the first communication connection may be via a cellular network or a wireless local area network localized at a central router, the mesh network may utilize short wavelength radio connections (e.g., BLUETOOTH®) or peer-to-peer wireless local area network connections (e.g., WI-FI DIRECT®) localized at a computing device similar to computing device 4. As such, computing device 4 is no longer reliant on the default cellular network or the wireless local area network localized at the router to contact computing device 12.

In further response to determining that the signal strength does not satisfy the threshold signal strength level, communication module 10 of computing device 4 may send, to computing device 12, and via the second wireless communication connection 20, one or more data packets 22. After connecting to mesh network 18, communication module 10 may send, using the second wireless communication connection, a signal that includes data packets 22 through mesh network 18 to computing device 12 over connection 20. In some instances, computing device 4 may send data packets 22 directly to computing device 12, such as if computing device 4 and computing device 12 are the only devices in mesh network 18. In other instances, computing device 4 may encode data packets 22 and include only a readable sequence that indicates computing device 12 as the final recipient. In such instances, other computing devices in mesh network 18 may forward data packets 22 amongst one another until they reach computing device 12, such as through the use of a routing table stored on the computing devices making up mesh network 18.

Rather than forcing a user to subscribe to multiple carriers' cellular networks, forcing the user to attempt to send the data packets from a different computing device, or simply notifying the user that the data packets failed to send and that the user must wait until computing device 4 can receive a sufficiently strong signal to connect to the cellular network, establishing mesh network 18 with other computing devices may enable computing device 4 to reliably and efficiently send data packets to a recipient computing device even when the cellular network signal strength for that particular device is too weak to send the data packets. Further, by automatically establishing mesh network 18, the techniques described herein may remove the need for computing device 4 to receive further input from the user in order to send the data packet, such as by switching applications or cellular networks. Rather than requiring computing device 4 to switch between multiple SIM cards to connect to multiple different cellular networks, computing device 4 may be configured to establish mesh network 18 between other computing devices to send data packets in areas with a weak signal strength. Establishing mesh network 18 may be less expensive and more reliable than a single user owning multiple computing devices, each on a different cellular network.

Figure 2:
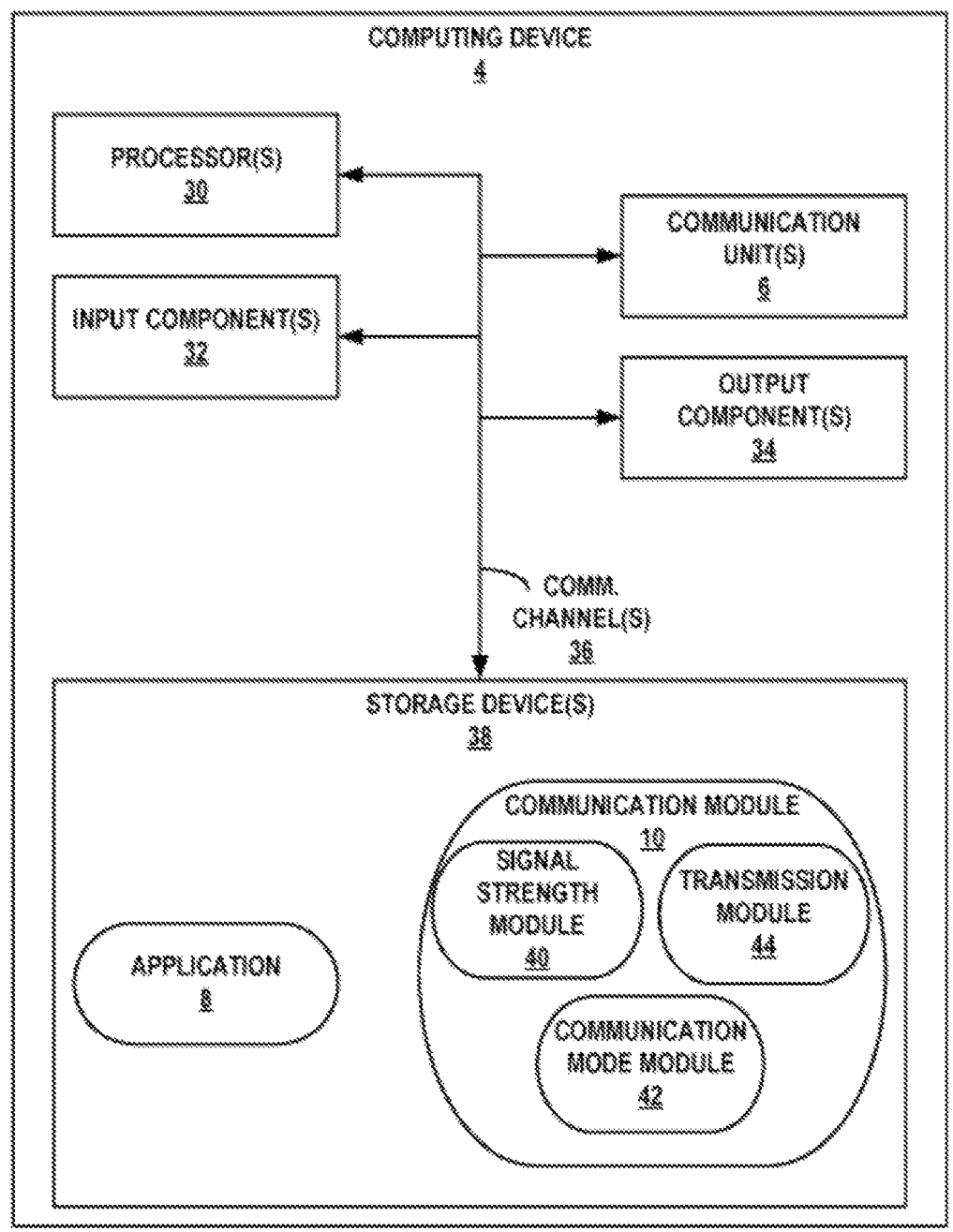
FIG. 2 is a block diagram illustrating further details of the example computing device of FIG. 1, in accordance with one or more aspects of the present disclosure.

FIG. 2 is a block diagram illustrating further details of the example computing device of FIG. 1, in accordance with one or more aspects of the present disclosure. FIG. 2 illustrates only one particular example of computing device 4, and many other examples of computing device 4 may be used in other instances.

As shown in the specific example of FIG. 2, computing device 4 includes one or more processors 30, one or more input components 32, one or more communication units 6, one or more output components 34, and one or more storage devices 38. Storage devices 38 of computing device 4, in the example of FIG. 2 include application 8, communication module 10, signal strength module 40, communication mode module 42, and transmission module 44. Each of components 6, 8, 10, 30, 32, 34, 48, 40, 42, and 44 may be interconnected (physically, communicatively, and/or operatively) for inter-component communications. In some examples, communication channels 36 may include a system bus, network connection, inter-process communication data structure, or any other channel for communicating data. As one example in FIG. 2, components 6, 8, 10, 30, 32, 34, 48, 40, 42, and 44 may be coupled by one or more communication channels 28. Application 8, communication module 10, signal strength module 40, communication mode module 42, and transmission module 44 may also communicate information with one another as well as with other components in computing device 4.

Processors 30, in one example, are configured to implement functionality and/or process instructions for execution within computing device 4. For example, processors 30 may be capable of processing instructions stored in storage device 38. Examples of processors 30 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 38 may be configured to store information within computing device 4 during operation. Storage device 38, in some examples, is described as a computer-readable storage medium. In some examples, storage device 38 is a temporary memory, meaning that a primary purpose of storage device 38 is not long-term storage. Storage device 38, in some examples, is described as a volatile memory, meaning that storage device 38 does not maintain stored contents when the computing device is turned off. Examples of volatile memories include random access memories (RAM), dynamic random access memories (DRAM), static random access memories (SRAM), and other forms of volatile memories known in the art. In some examples, storage device 38 is used to store program instructions for execution by processors 30. Storage device 38, in one example, is used by software or applications running on computing device 4 (e.g., application 8) to temporarily store information during program execution.

Storage devices 38, in some examples, also include one or more computer-readable storage media. Storage devices 38 may be configured to store larger amounts of information than volatile memory. Storage devices 38 may further be configured for long-term storage of information. In some examples, storage devices 38 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 4, in one example, also includes one or more input components 32. Input component 32, in some examples, is configured to receive input from a user through tactile, audio, or video feedback. Examples of input component 32 include a display component, a mouse, a keyboard, a camera, a microphone or any other type of device for detecting input from a user. In some examples, a display component includes a touch-sensitive screen.

One or more output components 34 may also be included in computing device 4. Output component 34, in some examples, is configured to provide output to a user using tactile, audio, or video stimuli. Output component 34, in one example, includes an electronic display, a loudspeaker, or any other type of device for converting a signal into an appropriate form understandable to humans or machines. The electronic display may be an LCD or OLED part of a touch screen, may be a non-touchscreen direct view display component such as a CRT, LED, LCD, or OLED. The display component may also be a projector instead of a direct view display.

In some examples, computing device 4 may further include components not pictured, such as a display component. The display component may be configured to output graphical content on the display and receive indications of user input via a presence-sensitive input component. In some examples, the presence-sensitive input component may detect an object at and/or near the screen of the display component. As one example range, the presence-sensitive input component may detect an object, such as a finger or stylus that is within 2 inches (~5.08 centimeters) or less of the physical screen of the display component. The presence-sensitive input component may determine a location (e.g., an (x,y) coordinate) of the display component at which the object was detected. In another example range, the presence-sensitive input component may detect an object 6 inches (~15.24 centimeters) or less from the physical screen of the display component and other exemplary ranges are also possible. The presence-sensitive input component may determine the location of the display selected by a user's finger using capacitive, inductive, and/or optical recognition techniques. In some examples, the presence-sensitive input component provides output to a user using tactile, audio, or video stimuli.

In accordance with techniques of this disclosure, input component 32 of computing device 4 may receive an indication of a user input to send, using application 8 currently executing at computing device 4, one or more data packets to a second computing device. In sending the one or more data packets, application 8 may provide data to communication unit 6, including an intended recipient and the one or more data packets, possibly via an operating system of computing device 4 in storage device 38. Communication unit 6 may then send the one or more data packets to the second computing device. For instance, application 8 may be a picture messaging application. In such instances, the picture messaging application is currently executing at computing device 4 and may receive an indication of a user input to send a picture message to a recipient associated with the second computing device. The picture messaging application may provide the requisite data to an operating system of computing device 4, which formats the data into a packet structure in accordance with a particular network protocol to be used to send the data packets. Communication unit 6 may attempt to send the provided data packets to the second computing device.

Responsive to receiving the indication of the user input, signal strength module 40 of computing device 4 may determine a signal strength of a first wireless communication connection. In some examples, the first wireless communication connection may be one of a cellular network connection or a wireless local area network connection (e.g., WI-FI®). For instance, signal strength module 40 may determine the signal strength using data from communication unit 6. In some examples, communication unit 6 may be configured to measure the current signal strength, such as in dBm (i.e., the power ration in decibels of the radio power per one milliwatt) or arbitrary strength units (ASU, i.e., a representation of a rate at which computing device 4 is able to update its location by connecting to nearby network sources). In other instances, communication unit 6 may output a signal in an attempt to contact a central server. In the example of FIG. 2, the output signal may have a weak signal strength or computing device 4 may be unable to establish a connection to the central server. The result of the attempted communication may be the basis for signal strength module 40 determining the signal strength of the first wireless communication.

Signal strength module 40 may further determine whether the signal strength of the first wireless communication connection satisfies a threshold signal strength level. For instance, a signal strength of −112 dBm may be low enough to routinely drop data packets or telephone calls in transmission. As such, signal strength module 40 may determine whether the signal strength is above or below −112 dBm. In another instance, a signal strength of 1 ASU may be low enough to routinely drop data packets or telephone calls in transmission. As such, signal strength module 40 may determine whether the signal strength is above or below 1 ASU. While the example of −112 dBm and 1 ASU are provided as examples of a threshold signal strength level in the example of FIG. 2, computing device 4 may institute a higher or lower threshold signal strength level based on a number of factors, including desirability to send communications of the first or second wireless communication connection, battery life, location of the intended recipient, or previous data usage, among other things.

Signal strength module 40 may determine whether the signal strength of the first wireless communication connection satisfies the threshold signal strength level. For example, signal strength module 40 may measure a current signal strength of the first wireless communication connection in response to computing device 4 receiving the user input to send the one or more data packets and compare the current signal strength to a threshold signal strength. In some examples, signal strength module 40 may determine whether the signal strength satisfies the threshold signal strength based on an amount of time over a predefined span of time that the signal strength for the first wireless communication connection satisfies the threshold signal strength level. Signal strength module 40 may then determine whether the amount of time over the predefined span of time that the signal strength for the first wireless communication is below the threshold signal strength level is greater than or equal to a threshold amount of time. Such examples may encompass instances where computing device 4 temporarily has a satisfactory signal strength for sending a picture message, but is in an area where the cellular coverage is intermittently below the threshold signal strength level and considered unreliable. In such instances, responsive to determining that the amount of time over the predefined span of time that the signal strength for the first wireless communication connection is below the threshold signal strength level is greater than or equal to the threshold amount of time, signal strength module 40 may determine that the signal strength does not satisfy the threshold signal strength level.

Signal strength module 40 may determine an average signal strength over a period of time. Signal strength module 40 may then compare this average signal strength to the threshold signal strength to determine. This provides another example for handling instances where computing device 4 temporarily has a satisfactory signal strength for sending a picture message, but is in an area where the cellular coverage is intermittently below the threshold signal strength level and considered unreliable.

Computing device 4 may establish the mesh network upon failing to completely send the picture message. In other words, computing device 4 may actually attempt to send the picture message to a central server. If computing device 4 fails to send the picture message to the central server, signal strength module 40 may automatically determine that the signal strength does not satisfy the threshold signal strength, causing communication mode module 42 to automatically establish the mesh network.

Responsive to determining that the signal strength does not satisfy the threshold signal strength level, communication mode module 42 of computing device 4 may automatically establish a different wireless communication connection to a mesh network over which the one or more data packets are sent to the second computing device. The second wireless communication connection may include the mesh network and use a different wireless communication protocol than the first wireless communication connection. For instance, if signal strength module 40 determines that the signal strength is 0 ASU, communication mode module 42 may toggle the type of communication connection and automatically connect to the mesh network. Conversely, responsive to determining that the signal strength of the first wireless communication connection satisfies the threshold signal strength level, transmission module may send the one or more data packets via communication unit 6 to the second computing device via the first wireless communication connection.

In further response to determining that the signal strength does not satisfy the threshold signal strength level, transmission module 44 of computing device 4 may send, to the second computing device, and via the second wireless communication connection, the one or more data packets. After connecting to the mesh network, transmission module 44 may send, using the second wireless communication connection, a signal that includes the one or more data packets through the mesh network to the second computing device.

In some instances, transmission module 44 of computing device 4 may send the one or more data packets directly to the second computing device, such as if computing device 4 and the second computing device are the only devices in mesh network. In other examples, if computing device 4 and the second computing device are both connected to the mesh network but are not in direct connection with one another, transmission module 44 may send the one or more data packets via the second wireless communication connection to an intermediate computing device. Each computing device in the mesh network may store a table that indicates which computing devices each respective computing device may directly contact. Using this routing table, intermediate computing devices may forward the one or more data packets through the mesh network until an intermediate computing device may directly forward the one or more data packets to the second computing device via the second wireless communication connection. In such examples, transmission module 44 of computing device 4 may encode the one or more data packets and include only a readable sequence that indicates the second computing device as the final recipient. In such instances, other computing devices in the mesh network may forward the one or more data packets amongst one another until the one or more data packets reach the second computing device 12.

In other examples, the second computing device may not be a part of the mesh network. In such instances, transmission module 44 may send, either directly or via one or more intermediate computing devices in the mesh network, the one or more packets to a third computing device, where the third computing device has a satisfactory signal strength for the first wireless communication connection. In other words, computing device 4 may send the one or more data packets through the mesh network to a computing device that is connected to a cellular network or a wireless local area network (e.g., WI-FI®), and the computing device may forward the one or more data packets to a central server responsible for distributing messages to the intended recipients over the cellular network or the Internet. In this way, the third computing device, in essence, sends the text message or picture message for computing device 4.

The mesh network may include one or more other computing devices with capabilities similar to that of computing device 4. In some instances, such as the example of FIG. 2, the mesh network may also include the second computing device, i.e. the intended recipient of the one or more data packets. While the first communication connection may be via a cellular network or a wireless local area network localized at a central router and connected to the Internet, the mesh network may utilize short wavelength radio connections (e.g., BLUETOOTH®) or wireless local area network connections (e.g., WI-FI DIRECT®) localized at a computing device similar to computing device 4 (i.e., not connected to the Internet). As such, computing device 4 may no longer be reliant on the default cellular network or the wireless local area network localized at the router to contact the second computing device.

In some examples, transmission module 44 may also receive sets of data packets via the second wireless communication connection from the mesh network, such as text or picture messages from the second computing device or another computing device within the mesh network. If the received data packets originate from a computing device outside of the mesh network, the received data packets may have been sent via the first wireless communication connection. In such instances, a computing device in the mesh network other than computing device 4 may retrieve the data packets from the central server, as computing device 4 does not have a satisfactory signal strength for the first wireless communication connection. The routing table stored on computing device 4 may indicate which intermediate computing device in the mesh network is connected to the central server. In such instances, computing device 4 may grant permission for the intermediate computing device to retrieve data packets intended for computing device 4 from the central server. The permitted intermediate computing device may then forward those data packets to computing device 4, allowing computing device 4 to receive messages sent over the first wireless communication connection even when computing device 4 does not have a sufficient signal strength.

Once computing device 4 is connected to the mesh network, computing device 4 may eventually disconnect from the mesh network once computing device 4 has a sufficient signal strength for the first wireless communication connection. For instance, after sending the one or more data packets via the second wireless communication connection, input component 32 may receive an indication of a second user input to send, using application 8 currently executing at computing device 4, a second set of data packets to the second computing device. Responsive to receiving the indication of the second user input, signal strength module 40 may an updated signal strength of the first wireless communication connection. Signal strength module 40 may determine that the updated signal strength now satisfies the threshold signal strength level in a manner similar to how the signal strength satisfaction was determined above. In such instances, communication mode module 42 may automatically disconnect from the second wireless communication connection and the mesh network. After disconnecting from the mesh network, transmission module 44 may send the second set of data packets to the second computing device via the first wireless communication connection. In other words, computing device 4 may emerge from a dead zone into in area with reliable cellular network coverage. Upon a user attempting to send data packets from computing device 4 to a recipient computing device, computing device 4 may check the signal strength for the cellular network. If the signal strength is adequate, computing device 4 may automatically disconnect from the mesh network, revoking any permissions granted to other computing devices for managing data packets intended for computing device 4.

In other examples, communication mode module 42 may automatically disconnect from the second wireless communication connection and the mesh network upon receiving a second set of data packets via the first communication connection. In other words, computing device 4 may assume that, if computing device 4 can receive data packets over the first wireless communication connection, the signal strength is adequate enough that communication mode module 42 may disconnect from the mesh network.

Figure 3:
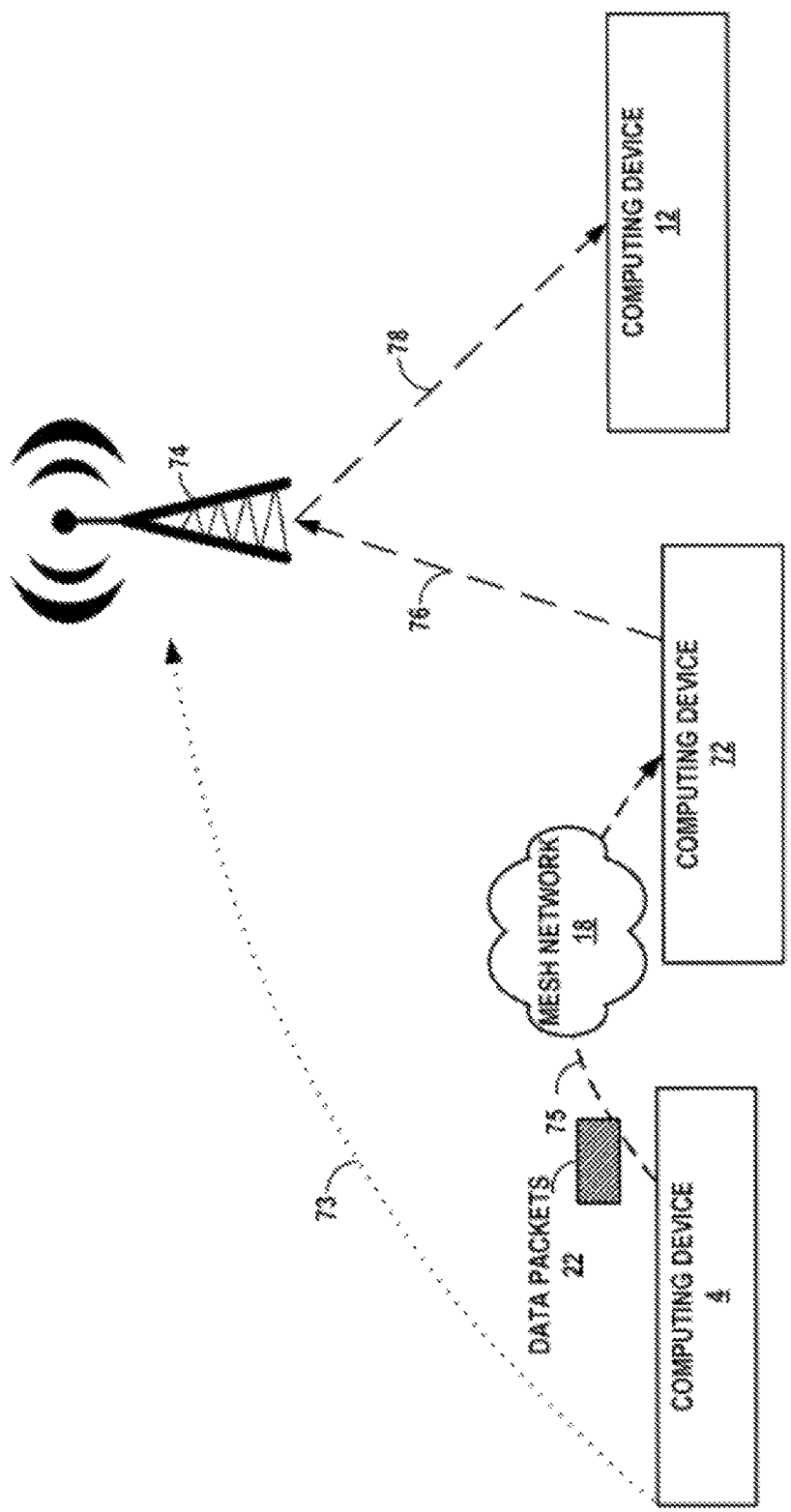
FIG. 3 is a conceptual diagram illustrating an example computing device configured to automatically establish a different network connection to send data packets to other computing devices, in accordance with one or more aspects of the present disclosure.

FIG. 3 is a conceptual diagram illustrating an example computing device configured to automatically establish a different network connection to send data packets to other computing devices, in accordance with one or more aspects of the present disclosure. In the example of FIG. 3, computing device 4 may be a computing device similar to computing device 4 as described with respect to FIGS. 1 and 2.

Figure 4:
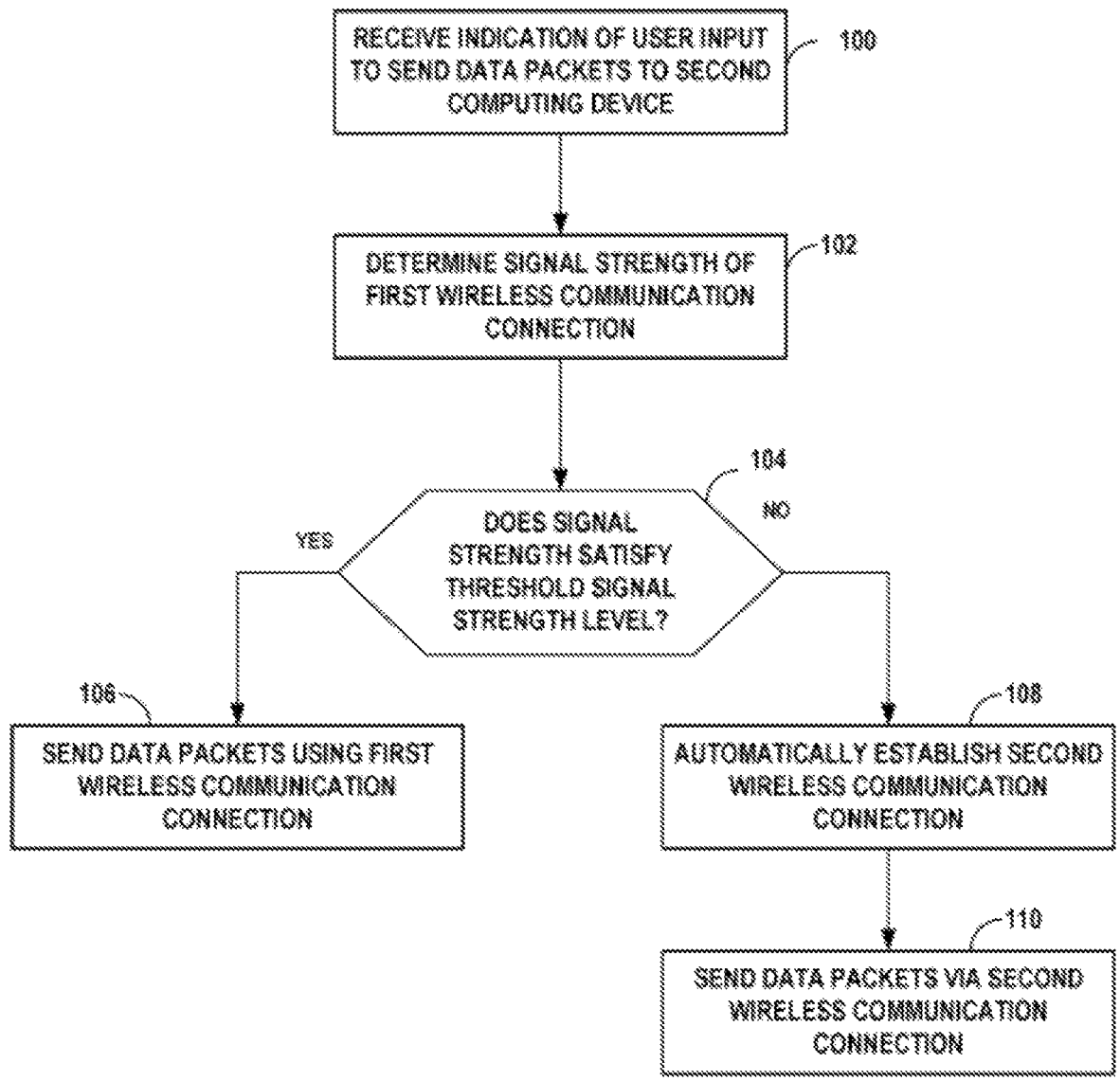
FIG. 4 is a flow diagram illustrating example operations of a computing device that implements techniques for automatically establishing a different network connection to send data packets to other computing devices, in accordance with one or more aspects of the present disclosure.

In the example of FIG. 3, computing device 4 may receive an indication of a user input to send, using an application currently executing at computing device 4, one or more data packets to computing device 12. Responsive to receiving the indication of the user input, computing device 4 may determine a signal strength of a first wireless communication connection. In some examples, the first wireless communication connection may be one of a cellular network connection or a wireless local area network connection (e.g., WI-FI®). For instance, computing device 4 may output signal 73 in an attempt to contact central server 74. In the example of FIG. 4, signal 73 may have a weak signal strength or computing device 4 may be unable to establish a connection to central server 74. The result of the attempted communication may be the basis for computing device 4 determining the signal strength of the first wireless communication.

Responsive to determining that the signal strength does not satisfy the threshold signal strength level, computing device 4 may automatically establish a different wireless communication connection to mesh network 18 over which the one or more data packets are sent to computing device 12. The second wireless communication connection may include mesh network 18 and use a different wireless communication protocol than the first wireless communication connection.

In the example of FIG. 3, computing device 12 may not be connected to the mesh network. In such instances, computing device 4 may send, either directly or via one or more intermediate computing devices in the mesh network, data packets 22 to computing device 72 over connection 75, where computing device 72 has a satisfactory signal strength for the first wireless communication connection to central server 74. In other words, computing device 4 may send the one or more data packets through mesh network 18 to computing device 72 that is connected to central server 74 over a cellular network or a wireless local area network (e.g., WI-FI®). Computing device 72 may then forward data packets 22 over connection 76 to central server 74, which is responsible for distributing messages to the intended recipients over the cellular network or the Internet. In this way, computing device 72, in essence, sends the text message or picture message for computing device 4. Central server 74 may then forward the data packets over connection 78 to computing device 12, the intended recipient of computing device 4's message.

Mesh network 18 may include one or more other computing devices with capabilities similar to that of computing device 4. While the first communication connection may be via a cellular network or a wireless local area network localized at a central router and connected to the Internet (e.g., WI-FI®), the mesh network may utilize short wavelength radio connections (e.g., BLUETOOTH® connections) or wireless local area network connections (e.g., a peer-to-peer wireless local area network connection, such as WI-FI DIRECT®) localized at a computing device similar to computing device 4 (i.e., not connected to the Internet). As such, computing device 4 may no longer be reliant on the default cellular network or the wireless local area network localized at the router to contact the second computing device via central server 74.

FIG. 4 is a flow diagram illustrating example operations of a computing device that implements techniques for automatically establishing a different network connection to send data packets to other computing devices, in accordance with one or more aspects of the present disclosure. The techniques of FIG. 4 may be performed by one or more processors of a computing device, such as computing device 4 illustrated in FIG. 1 and FIG. 2. For purposes of illustration, the techniques of FIG. 4 are described within the context of computing device 4 of FIG. 1, although computing devices having configurations different than that of computing device 4 may perform the techniques of FIG. 4. One or more of the steps described may be optional and not every step described/shown in the flow diagram of FIG. 4 is required to perform the techniques of this disclosure.

In accordance with techniques of this disclosure, computing device 4 may receive an indication of a user input to send, using application 8 currently executing at computing device 4, one or more data packets to a second computing device (100). In sending the one or more data packets, application 8 may provide data to communication unit 6, including an intended recipient and the one or more data packets, possibly via an operating system of computing device 4. Communication unit 6 may then send the one or more data packets to the second computing device. For instance, application 8 may be a video messaging application. In such instances, the video messaging application is currently executing at computing device 4 and may receive an indication of a user input to send a video message to a recipient associated with the second computing device. The video messaging application may provide the requisite data to an operating system of computing device 4, which formats the data into a packet structure in accordance with a particular network protocol to be used to send the data packets. Communication unit 6 may attempt to send the provided data packets to the second computing device. In other instances, application 8 may be a text messaging application, a picture messaging application, or any other application that may send data packets to a recipient computing device, including voice calls or video calls.

Responsive to receiving the indication of the user input, communication module 10 of computing device 4 may determine a signal strength of a first wireless communication connection (102). In some examples, the first wireless communication connection may be one of a cellular network connection or a wireless local area network connection (e.g., WI-FI®). For instance, communication module 10 may determine the signal strength using data from communication unit 6. In some examples, communication unit 6 may be configured to measure the current signal strength, such as in dBm (i.e., the power ration in decibels of the radio power per one milliwatt) or arbitrary strength units (ASU, i.e., a representation of a rate at which computing device 4 is able to update its location by connecting to nearby network sources). In other instances, communication unit 6 may output a signal in an attempt to contact a central server. In the example of FIG. 4, the output signal may have a weak signal strength or computing device 4 may be unable to establish a connection to the central server. The result of the attempted communication may be the basis for communication module 10 determining the signal strength of the first wireless communication.

Communication module 10 may further determine whether the signal strength of the first wireless communication connection satisfies a threshold signal strength level (104). For instance, a signal strength of −112 dBm may be low enough to routinely drop data packets or telephone calls in transmission. As such, signal strength module 40 may determine whether the signal strength is above or below −112 dBm. In another instance, a signal strength of 1 ASU may be low enough to routinely drop data packets or telephone calls in transmission. As such, communication module 10 may determine whether the signal strength is above or below 1 ASU. While the example of −112 dBm and 1 ASU are provided as examples of a threshold signal strength level in the example of FIG. 4, computing device 4 may institute a higher or lower threshold signal strength level based on a number of factors, including desirability to send communications of the first or second wireless communication connection, battery life, location of the intended recipient, or previous data usage, among other things.

Communication module 10 may determine whether the signal strength of the first wireless communication connection satisfies the threshold signal strength level. For example, communication module 10 may measure a current signal strength of the first wireless communication connection in response to computing device 4 receiving the user input to send the one or more data packets and compare the current signal strength to a threshold signal strength. In some examples, communication module 10 may determine whether the signal strength satisfies the threshold signal strength based on an amount of time over a predefined span of time that the signal strength for the first wireless communication connection satisfies the threshold signal strength level. Communication module 10 may then determine whether the amount of time over the predefined span of time that the signal strength for the first wireless communication is below the threshold signal strength level is greater than or equal to a threshold amount of time. Such examples may encompass instances where computing device 4 temporarily has a satisfactory signal strength for sending a picture message, but is in an area where the cellular coverage is intermittently below the threshold signal strength level and considered unreliable. In such instances, responsive to determining that the amount of time over the predefined span of time that the signal strength for the first wireless communication connection is below the threshold signal strength level is greater than or equal to the threshold amount of time, signal strength module 40 may determine that the signal strength does not satisfy the threshold signal strength level.

In still other instances, signal strength module 40 may determine an average signal strength over a period of time. Signal strength module 40 may then compare this average signal strength to the threshold signal strength to determine. This provides another examples for handling instances where computing device 4 temporarily has a satisfactory signal strength for sending a picture message, but is in an area where the cellular coverage is intermittently below the threshold signal strength level and considered unreliable.

Responsive to determining that the signal strength does not satisfy the threshold signal strength level ("NO" branch of 104), communication module 10 of computing device 4 may automatically establish a different wireless communication connection to a mesh network over which the one or more data packets are sent to the second computing device (108). The second wireless communication connection may include the mesh network and use a different wireless communication protocol than the first wireless communication connection. For instance, if communication module 10 determines that the signal strength is 0 ASU, communication module 10 may toggle the type of communication connection and automatically connect to the mesh network. Conversely, responsive to determining that the signal strength of the first wireless communication connection satisfies the threshold signal strength level ("YES" branch of 104), communication module 10 may send the one or more data packets via communication unit 6 to the second computing device via the first wireless communication connection (106).

In further response to determining that the signal strength does not satisfy the threshold signal strength level, communication module 10 of computing device 4 may send, to the second computing device, and via the second wireless communication connection, the one or more data packets (110). After connecting to the mesh network, communication module 10 may send, using the second wireless communication connection, a signal that includes the one or more data packets through the mesh network to the second computing device.

In some instances, communication module 10 of computing device 4 may send the one or more data packets directly to the second computing device, such as if computing device 4 and the second computing device are the only devices in mesh network. In other examples, if computing device 4 and the second computing device are both connected to the mesh network but are not in direct connection with one another, communication module 10 may send the one or more data packets via the second wireless communication connection to an intermediate computing device. Each computing device in the mesh network may store a table that indicates which computing devices each respective computing device may directly contact. Using this routing table, intermediate computing devices may forward the one or more data packets through the mesh network until an intermediate computing device may directly forward the one or more data packets to the second computing device via the second wireless communication connection. In such examples, communication module 10 of computing device 4 may encode the one or more data packets and include only a readable sequence that indicates the second computing device as the final recipient. In such instances, other computing devices in the mesh network may forward the one or more data packets amongst one another until the one or more data packets reach the second computing device.

In other examples, the second computing device may not be a part of the mesh network. In such instances, communication module 10 may send, either directly or via one or more intermediate computing devices in the mesh network, the one or more packets to a third computing device, where the third computing device has a satisfactory signal strength for the first wireless communication connection. In other words, computing device 4 may send the one or more data packets through the mesh network to a computing device that is connected to a cellular network or a wireless local area network (e.g., WI-FI®), and the computing device may forward the one or more data packets to a central server responsible for distributing messages to the intended recipients over the cellular network or the Internet. In this way, the third computing device, in essence, sends the text message or picture message for computing device 4.

Throughout the disclosure, examples are described where a computing device and/or a computing system may analyze information (e.g., locations, speeds, the content of the user interface, etc.) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed, etc.), or to dictate whether and/or how to the computing device may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device. Further, encryption may be utilized such that computing devices other than the intended recipient may not be capable of reading or storing information about the transferred data packets.

The mesh network may include one or more other computing devices with capabilities similar to that of computing device 4. In some instances, such as the example of FIG. 4, the mesh network may also include the second computing device, i.e. the intended recipient of the one or more data packets. While the first communication connection may be via a cellular network or a wireless local area network localized at a central router and connected to the Internet (e.g., WI-FI®), the mesh network may utilize short wavelength radio connections (e.g., BLUETOOTH® connections) or wireless local area network connections (e.g., a peer-to-peer wireless local area network connection, such as WI-FI DIRECT®) localized at a computing device similar to computing device 4 (i.e., not connected to the Internet). As such, computing device 4 may no longer be reliant on the default cellular network or the wireless local area network localized at the router to contact the second computing device.

In some examples, communication module 10 may also receive sets of data packets via the second wireless communication connection from the mesh network, such as text or picture messages from the second computing device or another computing device within the mesh network. If the received data packets originate from a computing device outside of the mesh network, the received data packets may have been sent via the first wireless communication connection. In such instances, a computing device in the mesh network other than computing device 4 may retrieve the data packets from the central server, as computing device 4 does not have a satisfactory signal strength for the first wireless communication connection. The routing table stored on computing device 4 may indicate which intermediate computing device in the mesh network is connected to the central server. In such instances, computing device 4 may grant permission for the intermediate computing device to retrieve data packets intended for computing device 4 from the central server. The permitted intermediate computing device may then forward those data packets to computing device 4, allowing computing device 4 to receive messages sent over the first wireless communication connection even when computing device 4 does not have a sufficient signal strength.

Once computing device 4 is connected to the mesh network, computing device 4 may eventually disconnect from the mesh network once computing device 4 has a sufficient signal strength for the first wireless communication connection. For instance, after ending the one or more data packets via the second wireless communication connection, computing device 4 may receive an indication of a second user input to send, using application 8 currently executing at computing device 4, a second set of data packets to the second computing device. Responsive to receiving the indication of the second user input, communication module 10 may an updated signal strength of the first wireless communication connection. Communication module 10 may determine that the updated signal strength now satisfies the threshold signal strength level in a manner similar to how the signal strength satisfaction was determined above. In such instances, communication module 10 may automatically disconnect from the second wireless communication connection and the mesh network. After disconnecting from the mesh network, transmission module 44 may send the second set of data packets to the second computing device via the first wireless communication connection. In other words, computing device 4 may emerge from a dead zone into in area with reliable cellular network coverage. Upon a user attempting to send data packets from computing device 4 to a recipient computing device, computing device 4 may check the signal strength for the cellular network. If the signal strength is adequate, computing device 4 may automatically disconnect from the mesh network, revoking any permissions granted to other computing devices for managing data packets intended for computing device 4.

In other examples, communication module 10 may automatically disconnect from the second wireless communication connection and the mesh network upon receiving a second set of data packets via the first communication connection. In other words, computing device 4 may assume that, if computing device 4 can receive data packets over the first wireless communication connection, the signal strength is adequate enough that communication module 10 may disconnect from the mesh network.

Example 1

A method comprising: receiving, by a first computing device, an indication of a user input to send, using an application currently executing at the first computing device, one or more data packets to a second computing device; responsive to receiving the indication of the user input, determining, by the first computing device, a signal strength of a first wireless communication connection to the second computing device, wherein the first wireless communication connection comprises one of a cellular network connection or a wireless local area network connection; determining, by the first computing device, whether the signal strength of the first wireless communication connection satisfies a threshold signal strength level; and responsive to determining that the signal strength does not satisfy the threshold signal strength level: automatically establishing, by the first computing device, a second wireless communication connection to the second computing device, wherein the second wireless communication connection includes a mesh network and uses a different wireless communication protocol than the first wireless communication connection; and sending, by the first computing device, to the second computing device, and via the second wireless communication connection, the one or more data packets.

Example 2

The method of example 1, further comprising: responsive to determining that the signal strength satisfies the threshold signal strength level, sending, by the first computing device, to the second computing device, and via the first wireless communication connection, the one or more data packets.

Example 3

The method of any of examples 1-2, wherein sending the one or more data packets via the second wireless communication connection comprises: sending, by the first computing device, to a third computing device, via one of a short wavelength radio connection or a wireless local area network connection, the one or more data packets.

Example 4

The method of example 3, wherein sending the one or more data packets via the second wireless communication connection further comprises: sending, by the first computing device, via the third computing device, and to a server device, the one or more data packets.

Example 5

The method of any of examples 1-4, wherein sending the one or more data packets via the second wireless communication connection comprises: sending, by the first computing device, directly to the second computing device, via one of a short wavelength radio connection or a wireless local area network connection, the one or more data packets.

Example 6

The method of any of examples 1-5, wherein the one or more data packets are associated with one of a text message, a picture message, or a video call.

Example 7

The method of any of examples 1-6, wherein the one or more data packets comprise a first set of data packets, the method further comprising: receiving, by the first computing device, from the second computing device, and via the second wireless communication connection, a second set of data packets.

Example 8

The method of any of examples 1-7, wherein the indication of the user input is an indication of a first user input, wherein the one or more data packets comprise a first set of data packets, the method further comprising: after sending the first set of data packets via the second wireless communication connection: receiving, by the first computing device, an indication of a second user input to send, using the application currently executing at the first computing device, a second set of data packets to the second computing device; responsive to receiving the indication of the second user input, determining, by the first computing device, an updated signal strength of the first wireless communication connection; determining, by the first computing device, whether the updated signal strength of the first wireless communication connection satisfies the threshold signal strength level; responsive to determining that the updated signal strength satisfies the threshold signal strength level: automatically disconnecting, by the first computing device, from the second wireless communication connection; and sending, by the first computing device, to the second computing device, and via the first wireless communication connection, the second set of data packets.

Example 9

The method of any of examples 1-8, wherein the one or more data packets comprise a first set of data packets, the method further comprising: after sending the first set of packets via the second wireless communication connection: receiving, by the first computing device, from the second computing device, and via the first wireless communication connection, a second set of data packets; and responsive to receiving the second set of data packets, automatically disconnecting, by the first computing device, from the second wireless communication connection.

Example 10

The method of any of examples 1-9, wherein determining whether the signal strength of the first wireless communication connection satisfies the threshold signal strength level comprises: determining, by the first computing device, an amount of time over a predefined span of time that the signal strength for the first wireless communication connection is below the threshold signal strength level; determining, by the first computing device, whether the amount of time over the predefined span of time that the signal strength for the first wireless communication connection is below the threshold signal strength level is greater than or equal to a threshold amount of time; and responsive to determining that the amount of time over the predefined span of time that the signal strength for the first wireless communication connection is below the threshold signal strength level is greater than or equal to the threshold amount of time, determining, by the first computing device, that the signal strength does not satisfy the threshold signal strength level.

Example 11

A computing device comprising: a wireless radio configured to send and receive data packets via a plurality of wireless communication connections; one or more processors; and a storage device configured to store one or more modules operable by the at least one processor to: receive an indication of a user input to send, using an application currently executing at the computing device, one or more data packets to a second computing device; responsive to receiving the indication of the user input, determine a signal strength of a first wireless communication connection to the second computing device, wherein the first wireless communication connection comprises one of a cellular network connection or a wireless local area network connection; determine whether the signal strength of the first wireless communication connection satisfies a threshold signal strength level; and responsive to determining that the signal strength does not satisfy the threshold signal strength level: automatically establish, using the wireless radio, a second wireless communication connection to the second computing device, wherein the second wireless communication connection includes a mesh network and uses a different wireless communication protocol than the first wireless communication connection; and send, using the wireless radio, to the second computing device, and via the second wireless communication connection, the one or more data packets.

Example 12

The computing device of example 11, wherein the one or more modules are further operable by the at least one processor to: responsive to determining that the signal strength satisfies the threshold signal strength level, send, to the second computing device, and via the first wireless communication connection, the one or more data packets.

Example 13

The computing device of any of examples 11-12, wherein sending the one or more data packets via the second wireless communication connection comprises the one or more modules being operable by the at least one processor to: send, via a third computing device, via one of a short wavelength radio connection or a wireless local area network connection, and to a server device, the one or more data packets.

Example 14

The computing device of any of examples 11-13, wherein sending the one or more data packets via the second wireless communication connection comprises the one or more modules being operable by the at least one processor to: send, directly to the second computing device, via one of a short wavelength radio connection or a wireless local area network connection, the one or more data packets.

Example 15

The computing device of any of examples 11-14, wherein the one or more data packets are associated with one of a text message, a picture message, or a video call.

Example 16

The computing device of any of examples 11-16, wherein the one or more data packets comprise a first set of data packets, wherein the one or more modules are further operable by the at least one processor to: receiving, by the first computing device, from the second computing device, and via the second wireless communication connection, a second set of data packets.

Example 17

The computing device of any of examples 11-16, wherein the indication of the user input is an indication of a first user input, wherein the one or more data packets comprise a first set of data packets, and wherein the one or more modules are further operable by the at least one processor to: after sending the first set of data packets via the second wireless communication connection: receive an indication of a second user input to send, using the application currently executing at the first computing device, a second set of data packets to the second computing device; responsive to receiving the indication of the second user input, determine an updated signal strength of the first wireless communication connection; determine whether the updated signal strength of the first wireless communication connection satisfies the threshold signal strength level; responsive to determining that the updated signal strength satisfies the threshold signal strength level: automatically disconnect from the second wireless communication connection; and send, to the second computing device, and via the first wireless communication connection, the second set of data packets.

Example 18

The computing device of any of examples 11-17, wherein the one or more data packets comprise a first set of data packets, and wherein the one or more modules are further operable by the at least one processor to: after sending the first set of packets via the second wireless communication connection: receive, from the second computing device, and via the first wireless communication connection, a second set of data packets; and responsive to receiving the second set of data packets, automatically disconnect from the second wireless communication connection.

Example 19

The computing device of any of examples 11-18, wherein determining whether the signal strength of the first wireless communication connection satisfies the threshold signal strength level comprises: determine an amount of time over a predefined span of time that the signal strength for the first wireless communication connection is below the threshold signal strength level; determine whether the amount of time over the predefined span of time that the signal strength for the first wireless communication connection is below the threshold signal strength level is greater than or equal to a threshold amount of time; and responsive to determining that the amount of time over the predefined span of time that the signal strength for the first wireless communication connection is below the threshold signal strength level is greater than or equal to the threshold amount of time, determine that the signal strength does not satisfy the threshold signal strength level.

Example 20

A non-transitory computer-readable storage medium encoded with instructions that, when executed, cause at least one processor of a computing device to: receive an indication of a user input to send, using an application currently executing at the computing device, one or more data packets to a second computing device; responsive to receiving the indication of the user input, determine a signal strength of a first wireless communication connection to the second computing device, wherein the first wireless communication connection comprises one of a cellular network connection or a wireless local area network connection; determine whether the signal strength of the first wireless communication connection satisfies a threshold signal strength level; and responsive to determining that the signal strength does not satisfy the threshold signal strength level: automatically establish a second wireless communication connection to the second computing device, wherein the second wireless communication connection includes a mesh network and uses a different wireless communication protocol than the first wireless communication connection; and send to the second computing device, and via the second wireless communication connection, the one or more data packets.

Example 21

A device comprising means for performing the method of any combination of examples 1-11.

Example 22

A computer-readable storage medium encoded with instructions that, when executed, cause at least one processor of a computing device to perform the method of any combination of examples 1-11.

Example 23

A device comprising at least one module operable by one or more processors to perform the method of any combination of examples 1-11.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A method comprising:
   receiving, by a first mobile device, a first user input indication indicating input to transmit a first set of data packets to a destination device;
   connecting, by the first mobile device, to a second mobile device via a first wireless communication connection;
   sending, by the first mobile device, the first set of data packets to the second mobile device via the first wireless communication connection, the first set of data packets when received by the second mobile device causing the second mobile device to transmit the first set of data packets to the recipient device via a second wireless communication connection, the second wireless communication connection comprising a different wireless protocol than the first wireless communication connection; and
   after the second mobile device sends the first set of data packets to the recipient device via the second wireless communication connection:
      receiving, at the first mobile device, a second user input indication indicating input to transmit a second set of data packets to the recipient device;
      disconnecting, by the first mobile device, from the first wireless communication connection with the second mobile device;
      connecting, by the first mobile device, to the recipient device via the second wireless communication connection; and
      sending, by the first mobile device, the second set of data packets to the recipient device via the second wireless communication connection.

2. The method of claim 1, wherein the first wireless communication connection comprises a short wavelength radio connection.

3. The method of claim 1, wherein the second wireless communication connection comprises a cellular network.

4. The method of claim 1, wherein the second wireless communication connection comprises a wireless local area network connection.

5. The method of claim 1, wherein the first mobile device comprises a computerized watch.

6. The method of claim 1, wherein the first mobile device comprises a wearable computing device.

7. The method of claim 1, wherein the second mobile device comprises a mobile telephone.

8. The method of claim 1, wherein the second mobile device comprises a tablet computer.

9. The method of claim 1, wherein the first set of data packets and the second set of data packets are associated with voice calls.

10. The method of claim 1, wherein:
    the first set of data packets are associated with one of a text message, a picture message, a voice call, or a video call; and
    the second set of data packets are associated with one of a text message, a picture message, a voice call, or a video call.

11. A mobile device comprising:
    data processing hardware; and
    memory hardware in communication with the data processing hardware and storing instructions that when executed, cause the data processing hardware to perform operations comprising:
       receiving a first user input indication indicating input to transmit a first set of data packets to a destination device;
       connecting to a second mobile device via a first wireless communication connection;
       sending the first set of data packets to the second mobile device via the first wireless communication connection, the first set of data packets when received by the second mobile device causing the second mobile device to transmit the first set of data packets to the recipient device via a second wireless communication connection, the second wireless communication connection comprising a different wireless protocol than the first wireless communication connection; and after the second mobile device sends the first set of data packets to the recipient device via the second wireless communication connection:
  receiving a second user input indication indicating input to transmit a second set of data packets to the recipient device;
  disconnecting from the first wireless communication connection with the second mobile device;
  connecting to the recipient device via the second wireless communication connection; and
  sending the second set of data packets to the recipient device via the second wireless communication connection.

12. The mobile device of claim 11, wherein the first wireless communication connection comprises a short wavelength radio connection.

13. The mobile device of claim 11, wherein the second wireless communication connection comprises a cellular network.

14. The mobile device of claim 11, wherein the second wireless communication connection comprises a wireless local area network connection.

15. The mobile device of claim 11, wherein the mobile device comprises a computerized watch.

16. The mobile device of claim 11, wherein the mobile device comprises a wearable computing device.

17. The mobile device of claim 11, wherein the second mobile device comprises a mobile telephone.

18. The mobile device of claim 11, wherein the second mobile device comprises a tablet computer.

19. The mobile device of claim 11, wherein the first set of data packets and the second set of data packets are associated with voice calls.

20. The mobile device of claim 11, wherein:
  the first set of data packets are associated with one of a text message, a picture message, a voice call, or a video call; and
  the second set of data packets are associated with one of a text message, a picture message, a voice call, or a video call.

* * * * *